March 19, 1968 J. R. CONRATH 3,374,474

NOISE SUPPRESSION CIRCUIT FOR MAGNETIC CORE MATRIX

Filed Sept. 24, 1963 2 Sheets-Sheet 1

INVENTOR
J. R. CONRATH
BY
William H. Kamstra
ATTORNEY

United States Patent Office 3,374,474
Patented Mar. 19, 1968

3,374,474
NOISE SUPPRESSION CIRCUIT FOR MAGNETIC CORE MATRIX

Jules R. Conrath, Salisbury Township, Lehigh County, Pa., assignor to Bell Telephone Laboratories, Incorporated, New York, N.Y., a corporation of New York Filed Sept. 24, 1963, Ser. No. 310,999
4 Claims. (Cl. 340—174)

ABSTRACT OF THE DISCLOSURE

A biased core access matrix for a magnetic memory is provided with nonlinear inductive devices coupled to matrix output circuits to memory word addresses. Each device saturates at a drive signal level greater than matrix shuttle noise level but less than an access information signal level from the matrix so that device high impedance to shuttle noises suppresses such noises. Suppressor devices are shown as individual cores for each output circuit and as a flat strip common to a group of output circuits. A memory employing magnetic wire memory elements is illustrated.

This invention relates to magnetic memory arrangements, and particularly to the suppression of noise signals generated therein by the operation of certain access switches.

Magnetic memory arrangements in which binary information is stored in the form of representative magnetic remanent states in a plurality of magnetic elements are well known in the prior art. Briefly, such a memory may comprise a coordinate array of toroidal magnetic cores each of which possesses substantially rectangular hysteresis characteristics. When such a memory is word-organized, the rows of cores are threaded by individual word conductors which, when selectively energized during interrogation of the memory, switch the cores of a row containing binary "1's" from one remanent state to the other and drive the cores containing binary "0's" further into saturation. These flux changes generate information representative output signals in sensing conductors which thread the corresponding cores of the word rows. The output signals representative of binary "1's" are large when compared with the "shuttle" signals generated by the unswitched cores containing binary "0's," which difference in amplitude makes possible discrimination therebetween. Only one word row conductor is energized during an interrogation and ideally the other word row conductors of the unselected rows should have no energizing drives applied thereto.

The word row conductors may themselves be energized by the switching of an access magnetic core and when the memory contains a plurality of memory planes, the latter cores are also arranged in rows and columns, the columns being associated with the planes of the memory and the rows defining the corresponding word rows of the planes. The rows and columns of cores of such an access switch are threaded, respectively, by row and column drive conductors and the word row conductors of the memory then comprise, respectively, the output windings for the cores of the switch. The selection of an access core, and thereby the selection of a word row conductor of the memory, is accomplished, as is well known, by the coincident energization of a selected one of the row conductors and a selected one of the column conductors. To both of the latter conductors is applied a half-select current pulse which alone is insufficient to switch a coupled core from one remanent state to another. At the crosspoint defined by the energized row and column conductor, the selected core defined thereat is obviously driven by both half-select current pulses which together are determined as being sufficient to switch the selected core. Conventionally, as the access core switches, a current pulse is generated in the coupled word row conductor of the memory which then serves as the access current for the memory during interrogation.

In the access switch thus generally described, it is assumed that the selected core was in a magnetic state opposite to that of the drive applied by the coincident selection current pulses. To insure that this is the case, means are typically provided in the switch to restore a selected core to the magnetic state obtaining prior to its selection. One circuit means for accomplishing this comprises a continuous winding threading each of the cores in the same sense. To this winding is applied a direct current which biases each of the cores into saturation in the desired direction. The coincident half-select current pulses applied by means of the row and column conductors then overcome this biasing drive to switch the selected core. At the termination of the access selection currents, the continuously applied biasing current restores the selected core to its prior magnetic state. Such an access switch is well known as a biased core switch.

Whenever, in the aforedescribed access switch, a particular core is selected by the coincident energization of the row and column drive conductors defining that core, it is apparent that each of the remaining cores of the row and column also occupied by the selected core will have a half-select current pulse applied thereto. These "half-selected" cores will not be switched, particularly in case of the biased core switch where they are urged toward saturation by the bias current. Because of the half-select drive thus applied to the other cores of the selected row and column, some excursion along the hysteresis loop does take place, however. In an ideal core having a literally square loop this excursion would have no effect since no change of flux density would result. As a practical matter the permeability of a saturated core is not zero and, as a result, the flux changes caused by the half-select current pulses in fact generate currents in the coupled word row conductors of the memory. Thus, in addition to the interrogating current pulse applied to the selected word row conductor by the complete switching of the selected core of the access switch, each of the word row conductors coupled to the cores which occupy the same row and column as the selected core, have shuttle currents induced therein. These shuttle currents will be small as compared with the full-select energizing current pulse and will be less than the threshold drive required to switch the information storage cores of the memory. In the latter cores, however, these shuttle currents are sufficient to cause some flux excursion. As a result, noise signals are generated by the shuttling cores of word rows other than the row being interrogated by the energized access switch. For the word rows of the plane which is defined by the column of cores in which the selected access core appears, these noise signals are additive since they appear in the same sensing conductors and may in aggravated instances be of the same order of magnitude as the information-representative output signals. The noise shuttle currents thus generated as an incident to coincident current selection in the access switch may seriously affect memory operating margins and interfere with the detection of the desired information output signals.

This invention has for one of its objects the suppression of the noise signals generated in a magnetic memory as the result of coincident current selection in a core matrix access switch.

Another object of this invention is to provide a new and novel access switch for a magnetic memory.

A further object of this invention is to improve the operating margins of magnetic memory arrangements.

The foregoing and other objects are realized in accordance with this invention by coupling to each of the word row conductors of a magnetic memory a nonlinear inductance. This element, which may be coupled in the word row conductor at its coupling to the associated core of the access switch, may itself comprise another toroidal core. The suppressor core is coupled only to the word row conductor and not to the row and column selection conductors of the access switch and presents a high inductance to the currents generated in the word row conductor by a half-selected core of the switch. On the other hand, the full energizing drive current in the selected word row conductor quickly saturates the suppressor core which then offers a negligible inductance to the drive current. Advantageously, the currents in the word row conductors of the memory coupled to the half-selected cores of the access switch are thus limited to only the exciting currents of the suppressor cores, while the full energizing drive current on the selected word row conductor is diminished only slightly.

It is thus a feature of this invention that a nonlinear inductor core is coupled to each of the word row conductors of a word-organized magnetic memory, which word row conductors are in turn coupled as the output windings respectively of the cores of the access switch of the memory. The core thus coupled effectively acts as a threshold device which inhibits the shuttle currents generated by the switch and presents only a negligible inductance to the full energizing currents generated thereby.

The foregoing and other objects and features of this invention will be better understood by a consideration of the detailed description of one specific illustrative embodiment of this invention when taken in conjunction with the accompanying drawing in which.

Figure 1:
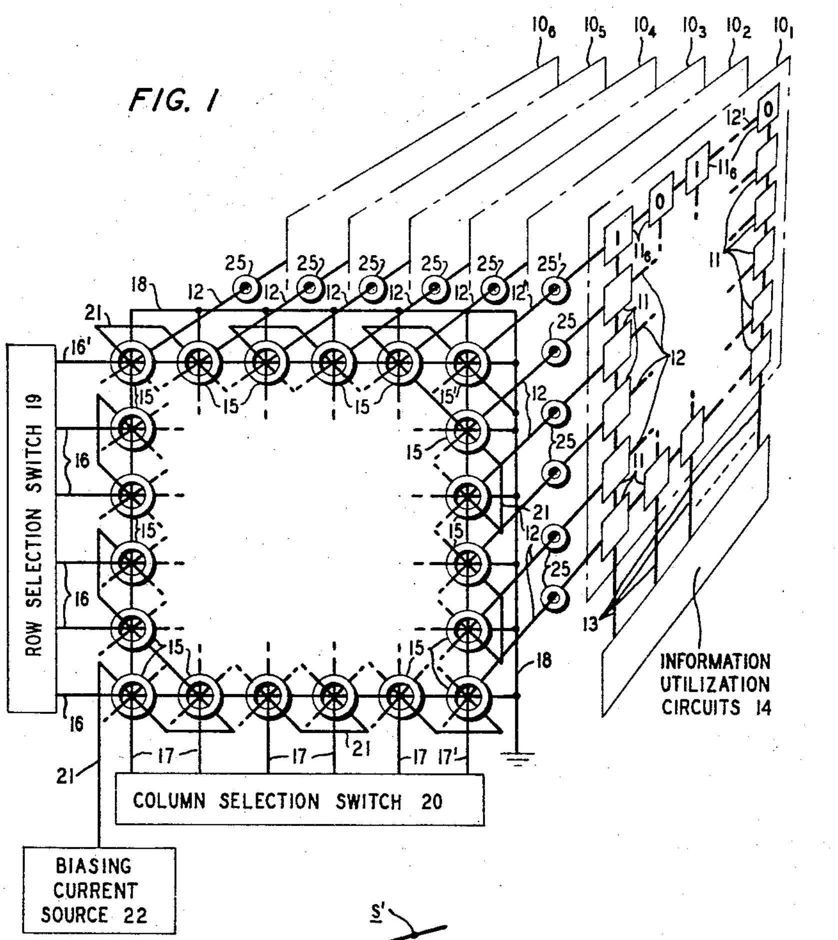
FIG. 1 depicts one illustrative embodiment of this invention adapted for use in a typical memory organization.

The principles of this invention may best be understood in the context of the memory organization depicted in FIG. 1. Since the components of a memory with which this invention may be adapted for use are well known in the art they need be described only in general terms here. The memory itself in which binary information is stored comprises a plurality of planes $10_1$ through $10_6$ each of which in turn comprises a coordinate array of information storage addresses 11. The memory planes 10 may take a number of forms in practice as is well known and, accordingly, are shown only in broken-line representation. The information storage addresses 11, although in the art also taking a variety of forms, are understood in accordance with the principles of this invention to comprise magnetic memory elements having remanent magnetic characteristics so that they remain in a particular remanent magnetic state when driven thereto by an appropriate magnetomotive force, and may be switched to another remanent magnetic state when another appropriate magnetomotive force is applied thereto. Thus, for example, the information storage addresses 11 may comprise toroidal magnetic cores, the address segments of magnetic memory wires, the address areas of apertured magnetic sheets, or any other magnetic element which, when interrogated by an access drive, generates in sensing conductors coupled thereto information representative output signals, and which may generate noise signals when excited by partial drives which may be applied during an interrogation operation.

The memory in the conventional manner is word-organized, that is, each of the addresses 11 of a row contains the bits of a binary word, and is thus organized by means of a plurality of word row conductors 12 each of which is serially coupled to all of the memory elements of a row. The corresponding storage elements of the word rows also have serially coupled thereto in a known manner a plurality of sensing conductors 13 which terminate at one end in information utilization circuits 14. This organization of the memory is explicitly shown only in the memory plane $10_1$, and it is to be understood that each of the remaining planes $10_2$ through $10_6$ is organized in an identical manner. The other terminations of the conductors 13 in the memory are omitted for the sake of simplicity, although it is to be assumed that appropriate circuit completing means are provided in practice.

Access to the word rows of the memory is selectively had by means of an access switch shown in the forefront of FIG. 1. This access switch comprises a coordinate array of magnetic cores 15, the columns of which are associated respectively with the planes 10 of the memory and the rows of which are associated respectively with the corresponding word rows of the latter planes. The rows of cores 15 have threaded therethrough, respectively, a plurality of row conductors 16 and the columns of cores 15 have threaded therethrough, respectively, a plurality of column conductors 17. The row and column conductors 16 and 17 each terminate at one end at a ground bus 18 and at the other ends these conductors terminate at a row selection switch 19 and a column selection switch 20, respectively. The cores 15 also have continuously threaded therethrough a biasing conductor 21 which terminates at one end in the ground bus 18 and at the other end in a source of biasing current 22.

The cores 15 of the access switch are finally also threaded by, or have otherwise inductively coupled thereto, the word row conductors 12 of the memory planes. In accordance with the aforementioned association of the cores of the access switch and the memory planes, the word row conductors 12 of the planes 10 are coupled respectively to the cores 15 of the columns of cores of the access switch. To avoid complexity, the terminations of the word row conductors 12 have been omitted from the drawing, although in practice it will be appreciated that appropriate circuit completing means are provided.

In accordance with the principles of this invention each of the word row conductors 12 also threads, or is otherwise coupled to, a suppressor core 25. The cores 25, only representative ones of which are shown in the drawing, each have nonlinear hysteresis characteristics and are formed to have as short a flux path as possible. For reasons which will become apparent hereinafter, the saturation flux of the cores 25 is substantially less, say, by a factor of ten or twenty, than the flux switched by the complete switching of a core 15 of the access switch, although the saturation flux of the cores 25 is greater than the flux change in a core 15 generated by a half-select current pulse as will be discussed hereinafter. Other characteristics of the cores 25 will be described in connection with an illustrative operation of this invention in the organization of the memory of FIG. 1 which follows.

For purposes of describing an illustrative operation of this invention, an interrogation of the last word row of plane $10_1$ of the memory containing the storage addresses $11_6$ will be assumed. It will further be assumed that this word row contains the binary word 1, 0, 1, . . . 0. The information thus present in the exemplary word row and elsewhere in the memory is assumed to have been introduced during a previous information changing operation, the manner of which is not a matter of concern in this description. Similarly, the precise manner of storage or flux state in which the binary information is represented in an information address 11 is also unimportant to an understanding of this invention. The advantages of this invention are realized when the particular memory element or manner of magnetic storage of information is of a character which may generate noise signals responsive to shuttle currents encountered on the word row conductors during an interrogation.

The interrogation of the exemplary word row storage addresses $11_6$ is acomplished in the conventional manner by the selection of the access switch core 15' to which the associated word row conductor 12' is coupled. This selection, in turn, is accomplished by the selection of row and column conductors 16' and 17', respectively, defining the selected core 15', by the coincident application thereto of half-select current pulses from the row and column selection switches 19 and 20, respectively. Prior to and during this coincident application, the selected core 15' as well as each of the other cores 15 of the access switch is acted upon by the biasing drive provided by the biasing current source 22 by means of the biasing conductor 21. This drive is symbolically represented in FIG. 2A in connection with an idealized hysteresis characteristic curve 25 of the cores 15 and 15'. The biasing drive *b* holds, prior to the application of the coincident selection currents, each of the cores of the access switch in magnetic saturation at the point *s* on the curve 26. When the coincident half-select, additive drives, indicated individually in FIG. 2A as *d*/2, are applied to the selected core 15' as the result of the coincident currents from the switches 19 and 20, the latter core is caused to switch from its point *s* on its hysteresis curve to the point of opposite saturation *s'*. The resulting complete flux change induces an interrogation current pulse in the coupled row conductor 12' which pulse is operative in the conventional manner to interrogate the memory elements of the information addresses $11_6$ of the selected word row. Also conventionally, the addresses containing binary "1's" will induce relatively large output signals in their sensing conductors 13 while the addresses containing binary "0's" may generate only negligible signals on their sensing conductors 13.

Figure 2A:
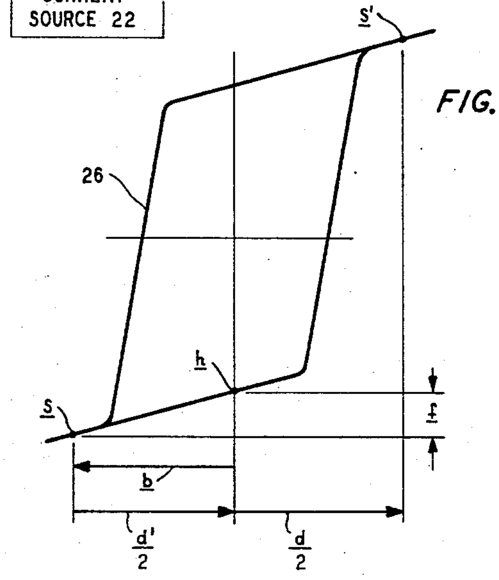
FIGS. 2A and 2B depict in idealized form a comparison of hysteresis characteristics curves of two core elements employed in the illustrative embodiment of the invention of FIG. 1.

In the foregoing operation, it is apparent that the coincident currents applied to the row and column conductors 16' and 17', respectively, will cause half-select drives, as indicated in FIG. 2A by the arrow *d*/2', to be applied to each of the remaining cores 15 which share the row and column conductors 16' and 17'. Each of these cores will accordingly have the biasing drive *b* being applied thereto cancelled and will move along their hysteresis curves to the point *h* as a result of the single half-select drives *d*/2'. The resulting change of flux *f* in these cores will generate shuttle currents in their coupled row conductors 12, which currents will be applied to the memory elements of the information addresses 11 of the memory planes 10. The shuttle currents will in turn cause minor flux excursions in the address memory elements with the result that noise signals will be generated in the coupled sensing conductors 13. In the case of the plane $10_1$ including the word row being interrogated, these noise signals will be additive since each of its row conductors 12 other than the row conductor 12' will be shuttled by the half-selection of the cores 15 coupled to column conductor 17'. The rows of information addresses 11 in the planes $10_2$ through $10_6$ will also be excited by the shuttle currents generated by the half-selected cores 15 coupled to the energized row conductor 16'. In the case of the memory organization depicted in FIG. 1, the noise signals generated thereby will have a minimum disturbing effect since none of these excited addresses fall in the same plane as the word row being interrogated. In some memory arrangements these noise signals could also be detrimental to memory margins, however.

Figure 2B:
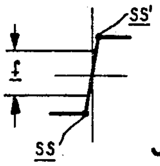

In accordance with this invention, the cores 25 coupled to the word row conductors 12 alone, advantageously reduce the shuttle currents generated therein by half-selected cores and hence also substantially eliminate the excitation of the memory elements of uninterrogated word rows of memory. The operation of a suppressor core 25 depends on its ability to switch flux rapidly with a small current drive. The latter current is accordingly the value to which the shuttle current in a half-selected word conductor 12 is limited in this invention. Although a theoretically ideal situation would be one in which the suppressor core 25 is switched with zero current, in a practical application the core 25 will have a hysteresis characteristic curve such as is ideally depicted in FIG. 2B, which figure is projected from FIG. 2A. As there depicted, a core 25 will be linear up to the points of saturation *ss* and *ss'* whereupon its flux density remains constant regardless of the increase in drive applied thereto. Whatever the configuration of its hysteresis characteristic curve however, a core 25 is of such a size that its saturation flux is greater than the flux shuttled in a half-selected access core 15 but, as previously mentioned, much less, by a factor of ten or twenty, than the saturation flux of an access core 15. This comparison is shown in FIG. 2A where the flux *f* shuttled in a core 15 is projected to FIG. 2B and there shown as being less than the saturation points *ss* and *ss'* of the suppressor core 25 but which latter saturation points are substantially less than the saturation points *s* and *s'* of an access core 15.

In the foregoing illustrative operation, the full-valued interrogation current pulse applied to the word row conductor 12' by the completely switching core 15' will quickly drive the suppressor core 25' into saturation after which the impedance presented by the latter core drops to substantially zero. The interrogation pulse is thus diminished only negligibly for this desired drive. The shuttle current pulses generated by the other cores 15 of the selected row and column of the access switch are on the other hand, of insufficient magnitude to saturate the associated suppressor cores 25. The voltages generated across the impedance presented by the latter suppressor cores are of a polarity opposite to that of voltages generated across the coupling of the solenoids 12 with the associated cores 15 and are each of a magntiude substantially to cancel the latter voltages. The shuttle currents in the unselected word row conductors 12 are thus substantially reduced without materially affecting the full-valued interrogation current in the selected word row conductor 12'.

In one embodiment of this invention, it was found that the shuttle currents generated by toroidal access cores of manganese magnesium cadmium ferrite having dimensions as follows, O.D., .170 inch, I.D., .080 inch, and a height of .100 inch, were substantially reduced when toroidal suppressor cores of nickel zinc ferrite having dimensions as follows, O.D., .055 inch, I.D., .035, and a height of .030 inch, were employed in accordance with this invention. In this case the half-select drives applied to the access cores were each 2.4 ampere-turns of 0.5 microsecond rise time and 2.0 microseconds duration, with a direct current bias of 2.4 ampere-turns.

Figure 3:
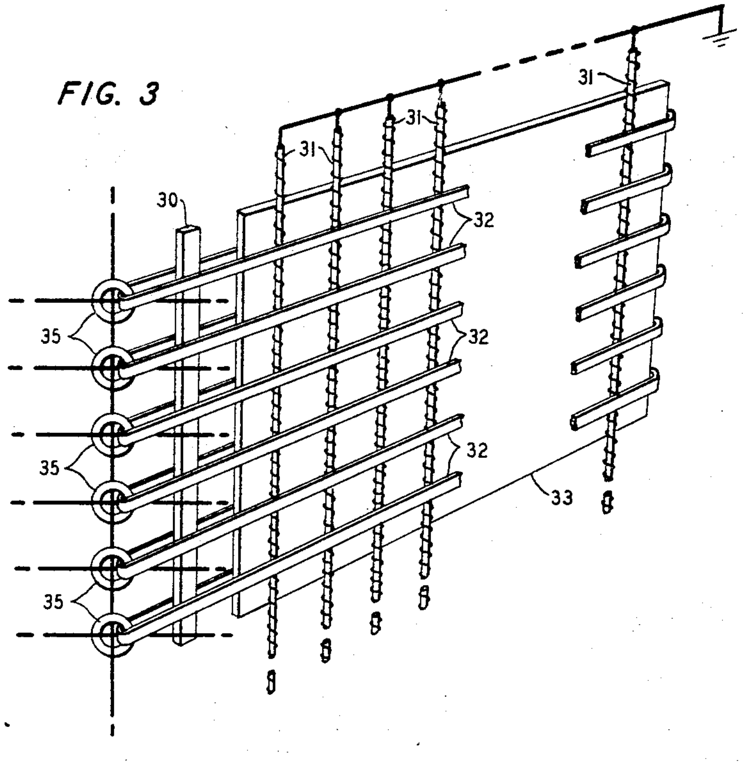
FIG. 3 shows, in connection with a single plane of a memory arrangement, another illustrative embodiment of this invention.

Another advantageous embodiment of this invention is depicted in FIG. 3. In this embodiment the individual suppressor cores 25 of the embodiment of FIG. 1 take the form of a single inductor strip 30. Although again the memory elements may take any form well known in the art, the inductor strip 30 is shown in association with a memory plane in which each of the information addresses comprises a segment of a magnetic wire memory element. Such memory elements are well known and are described, for example, in Patent No. 3,083,353 of A. H. Bobeck, issued Mar. 26, 1963. The information addresses are defined on a plurality of parallel wire memory elements 31 by a plurality of transverse parallel word row conductors 32, which conductors take the form of flat strip solenoids. The conductors 32 are passed around the memory elements 31 for inductive coupling and also around a retaining board 33 in a manner well known to one skilled in the art. The conductors 32 further form a closed loop and, as depicted in the forefront of FIG. 3, each has coupled thereto a magnetic core 35, two representative ones of which are shown in the figure. For the sake of simplicity only a single plane of a multiplane memory is shown in FIG. 3; however, it is to be understood that the embodiment of the latter figure is organized in a manner identical to that depicted in FIG. 1. Thus, the cores 35 are arranged together with other identical cores, not shown, in a coordinate array to comprise an access switch of the character already described in detail.

Advantageously, the inductor strip 30 which has the same characteristics as described in connection with the inductor cores 25 of the embodiment of FIG. 1, passes continuously between the two loop sections of the word row conductors 32 and is in inductive coupling with the latter elements. In known wire memory element arrangements, the elements are conveniently embedded in a flexible tape of a nonmagnetic material such as, for example, the material known commercially as Mylar. The inductor strip 30 may thus advantageously simply be added to the memory element assembly. The operation of the embodiment of FIG. 3 is identical to that described in connection with the embodiment depicted in FIG. 1, and accordingly need not be repeated here. The shuttle currents which may generate undesirable noise signals during the interrogation of a memory contemplated in conjunction with this invention are substantially reduced with attendant improved operating margins.

What has been described is considered to be only illustrative embodiments according to the principles of this invention, and it is to be understood that various and numerous other arrangements may be devised by one skilled in the art without departing from the spirit and scope of this invention as defined by the following claims.

What is claimed is:

1. Access switch means for a magnetic memory having a plurality of access conductors comprising a plurality of access magnetic cores coupled respectively to said plurality of access conductors, each of said access cores having a substantially rectangular hysteresis characteristic curve and residing in one point of saturation on said curve, coincident current means for selecting said access cores comprising means for applying a first half-select drive to each of said access cores, said last-mentioned drives causing said cores to move from said one point of saturation partially in the opposite direction of saturation and inducing shuttle currents in said access conductors, and means for also applying a second half-select drive to a selected one of said access cores, said first and second half-select drives causing said selected core to move from said one point of saturation substantially in said opposite direction of saturation to induce an energization current in the coupled access conductor; and means for suppressing said shuttle currents comprising an individual nonlinear inductor means coupled only to each of said access conductors, each of said inductor means comprising a portion of a flat strip associated transversely with said access conductors.

2. In a magnetic memory arrangement having a plurality of information storage elements, the combination comprising a doubled flat strip conductor means associated with each of said storage elements, a first magnetic core coupled to said conductor means, said first core undergoing a first change in flux responsive to the application of a first predetermined drive when at a saturation point on its hysteresis loop and also undergoing a second change in flux larger than said first change responsive to the coincident application of a second drive substantially equal to said first drive, said first and second changes in flux inducing relatively small and large signals on said conductor means, respectively, and means for suppressing said small signals comprising a second magnetic core coupled to said conductor means, said second core comprising a single flat strip passed substantially transversely inside said doubled flat strip, said second core having a nonlinear hysteresis loop so as to remain magnetically unsaturated by said small signals and to be magnetically saturated by said large signals.

3. In a magnetic memory arrangement having a plurality of information storage elements, the combination according to claim 2 in which the saturation flux of said second core is greater than said first change in flux of said first core and substantially less than said second change in flux of said first core.

4. In a magnetic memory arrangement having a plurality of rows of information storage elements, the combination comprising a plurality of conductor means associated respectively with said rows of storage elements, each of said conductor means comprising a first flat strip doubled around a row of said storage elements, a plurality of first magnetic cores coupled respectively to said plurality of conductor means and arranged in rows and columns, each of said first cores undergoing a first change in flux density responsive to the application of a first predetermined drive when at a saturation point on its hysteresis loop and also undergoing a second change in flux density larger than said first change responsive to the conincident application of a second drive substantially equal to said first drive, said first and second changes in flux density inducing, respectively, relatively small and large signals on the coupled conductor means, means for maintaining each of said first cores at a particular saturation point on its hysteresis loop, a plurality of row conductors coupled respectively to the first cores of each of said rows, a plurality of column conductors coupled respectively to the first cores of each of said columns, said row and column conductors being selectively energizable for applying said first and second predetermined drives, respectively, to the coupled first cores of selected rows and columns, and means for suppressing said small signals on said plurality of conductor means comprising a plurality of second magnetic cores each comprising a second flat strip passed substantially transversely inside said plurality of doubled first flat strips, and coupled respectively thereto, said second cores having a nonlinear hysteresis loop so as to remain magnetically unsaturated by said small signals and to be magnetically saturated by said large signals.

References Cited

UNITED STATES PATENTS

| | | | |
|---|---|---|---|
| 3,112,409 | 11/1963 | Engelbart | 340—174 |
| 3,138,788 | 6/1964 | Nitzan | 340—174 |
| 3,115,619 | 12/1963 | Barrett | 340—174 |
| 3,144,641 | 8/1964 | Raffel | 340—174 |
| 3,157,860 | 11/1964 | Batley | 340—174 |
| 3,208,043 | 9/1965 | Shortle | 340—174 |
| 3,208,044 | 9/1965 | Vogl | 340—174 |

TERRELL W. FEARS, *Primary Examiner.*

BERNARD KONICK, JAMES W. MOFFITT, *Examiners.*

M. S. GITTES, *Assistant Examiner.*